United States Patent
Zhang et al.

(10) Patent No.: US 12,414,665 B2
(45) Date of Patent: Sep. 16, 2025

(54) COLLIDED POSITION DETERMINATION METHOD, COMPUTER-READABLE STORAGE MEDIUM, AND ROBOT

(71) Applicant: UBTECH ROBOTICS CORP LTD, Shenzhen (CN)

(72) Inventors: Simin Zhang, Shenzhen (CN); Yongsheng Zhao, Shenzhen (CN); Jichao Jiao, Shenzhen (CN); Jiahao Ji, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 164 days.

(21) Appl. No.: 18/372,003

(22) Filed: Sep. 22, 2023

(65) Prior Publication Data

US 2024/0215788 A1   Jul. 4, 2024

(30) Foreign Application Priority Data

Dec. 30, 2022   (CN) .......................... 202211729209.2

(51) Int. Cl.
   *G05D 1/00*   (2024.01)
   *A47L 9/28*   (2006.01)
   *A47L 11/40*   (2006.01)

(52) U.S. Cl.
   CPC ......... *A47L 11/4011* (2013.01); *A47L 9/2805* (2013.01); *A47L 9/2852* (2013.01); *G05D 1/0214* (2013.01); *A47L 2201/04* (2013.01)

(58) Field of Classification Search
   CPC .. A47L 11/4011; A47L 9/2805; A47L 9/2852; A47L 2201/04; A47L 11/4061; G05D 1/0214; G05D 1/617; G05D 1/622; B25J 9/1666
   See application file for complete search history.

(56) References Cited

U.S. PATENT DOCUMENTS

| | | | |
|---|---|---|---|
| 2011/0270443 A1* | 11/2011 | Kamiya | G05B 19/401 901/46 |
| 2016/0199140 A1* | 7/2016 | Gombert | A61B 1/00009 606/130 |

* cited by examiner

*Primary Examiner* — Bao Long T Nguyen

(57) ABSTRACT

A collided position determination method, a computer-readable storage medium, and a robot are provided. The method includes: obtaining, from a collision sensor of the robot, a triggered signal corresponding to a collision of the robot; determining at least two candidate positions of the collision based on the triggered signal corresponding to the collision; obtaining a motion trajectory of the robot after the collision; and obtaining a collided position by screening each of the candidate positions of the collision according to the motion trajectory. In this manner, when the robot collides during its movement, the collision signal generated by the collision sensor of the robot can accurately mark the collided position, thereby reducing the probability of the robot colliding again at the same position.

20 Claims, 7 Drawing Sheets

COLLIDED POSITION DETERMINATION METHOD, COMPUTER-READABLE STORAGE MEDIUM, AND ROBOT

CROSS REFERENCE TO RELATED APPLICATIONS

The present disclosure claims priority to Chinese Patent Application No. 202211729209.2, filed Dec. 30, 2022, which is hereby incorporated by reference herein as if set forth in its entirety.

BACKGROUND

1. Technical Field

The present disclosure relates to robot technology, and particularly to a collided position determination method, a computer-readable storage medium, and a robot.

2. Description of Related Art

With the continuous development of robot technology, cleaning robots can perform intelligent trajectory planning based on the surrounding environment, and many families have chosen cleaning robots to perform domestic cleaning works. However, the collision sensors used by the existing cleaning robot can only generate trigger signals, and the robot can only distinguish left collision, right collision and front collision using the collision sensors disposed at its left, right and front part, respectively, which causes the robot unable to accurately calculate the collided position for marking.

BRIEF DESCRIPTION OF THE DRAWINGS

To describe the technical schemes in the embodiments of the present disclosure or in the prior art more clearly, the following briefly introduces the drawings required for describing the embodiments or the prior art. It should be understood that, the drawings in the following description merely show some embodiments. For those skilled in the art, other drawings can be obtained according to the drawings without creative efforts.

DETAILED DESCRIPTION

Figure 1:
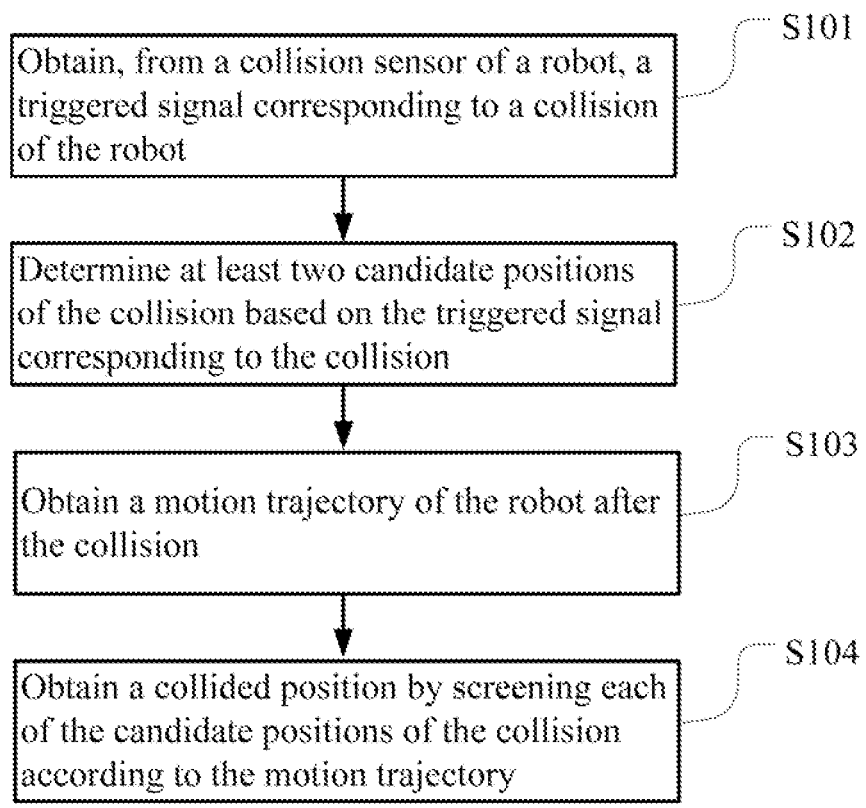
FIG. 1 is a flow chart of a collided position determination method according to an embodiment of the present disclosure.

In order to make the objects, features and advantages of the present disclosure more obvious and easy to understand, the technical solutions in the embodiments of the present disclosure will be clearly and completely described below with reference to the drawings. Apparently, the described embodiments are part of the embodiments of the present disclosure, not all of the embodiments. All other embodiments obtained by those skilled in the art based on the embodiments of the present disclosure without creative efforts are within the scope of the present disclosure.

It is to be understood that, when used in the description and the appended claims of the present disclosure, the terms "including" and "comprising" indicate the presence of stated features, integers, steps, operations, elements and/or components, but do not preclude the presence or addition of one or a plurality of other features, integers, steps, operations, elements, components and/or combinations thereof.

It is also to be understood that, the terminology used in the description of the present disclosure is only for the purpose of describing particular embodiments and is not intended to limit the present disclosure. As used in the description and the appended claims of the present disclosure, the singular forms "one", "a", and "the" are intended to include the plural forms as well, unless the context clearly indicates otherwise.

It is also to be further understood that the term "and/or" used in the description and the appended claims of the present disclosure refers to any combination of one or more of the associated listed items and all possible combinations, and includes such combinations.

As used in the description and the appended claims, the term "if" may be interpreted as "when" or "once" or "in response to determining" or "in response to detecting" according to the context. Similarly, the phrase "if determined" or "if [the described condition or event] is detected" may be interpreted as "once determining" or "in response to determining" or "on detection of [the described condition or event]" or "in response to detecting [the described condition or event]".

In addition, in the description of the present disclosure, the terms "first", "second", "third", and the like in the descriptions are only used for distinguishing, and cannot be understood as indicating or implying relative importance.

In the embodiments of the present disclosure, a robot such as a sweeping robot, a mopping robot, a window cleaning robot, or a vacuuming robot may be taken as an execution subject.

According to the existing technology, a robot may perform intelligent trajectory planning based on a SLAM (simultaneous localization and mapping) grid map. By sensing the obstacles in a map through its own line laser, and collision and infrared sensors to mark them in a grid map, thereby planning trajectory and avoiding collisions with obstacles. However, in the present disclosure, more accurate marking of collided positions can be achieved by just using the collision sensors of the robot, which improves the accuracy of the navigation map generated by the robot subsequently.

FIG. 1 is a flow chart of a collided position determination method according to an embodiment of the present disclosure. In this embodiment, a computer-implemented method for determining collided positions is provided. The collided position determination method may be applied on (a processor of) a robot shown in FIG. 7. The robot has collision sensors disposed at, for example, a front part (e.g., a part of the robot at its forward direction), a left part and a right part of the robot, respectively. In other embodiments, the method may be implemented through a collided position determination apparatus shown in FIG. 6. As shown in FIG. 1, in this embodiment, the collided position determination method may include the following steps.

S101: obtaining, from a collision sensor of the robot, a triggered signal corresponding to a collision of the robot.

When a collision of the robot with an obstacle happens, a rough collided area on the robot may be determined using the triggered signal corresponding to the collision that is generated by the collision sensor. For example, if the triggered signal corresponding to the collision is generated at the left part of the robot, it may be determined that the collision has occurred in the area at the left part of the robot; if the triggered signal corresponding to the collision is generated at the front part of the robot, it may be determined that the collision has occurred in the area at the front part of the robot; and if the triggered signal corresponding to the collision is generated at the right part of the robot, it may be determined that the collision has occurred in the area at the right part of the robot. Then, the specific position of the collision may be further determined based on the determined collided area.

S102: determining at least two candidate positions of the collision based on the triggered signal corresponding to the collision.

If the triggered signal corresponding to the collision is a left collision signal, it determines the at least two candidate positions of the collision at the left part of the robot; if the triggered signal corresponding to the collision is a right collision signal, it determines the at least two candidate positions of the collision at the right part of the robot; and if the triggered signal corresponding to the collision is a front collision signal, it determines the at least two candidate positions of the collision at the front part of the robot.

Figure 2:
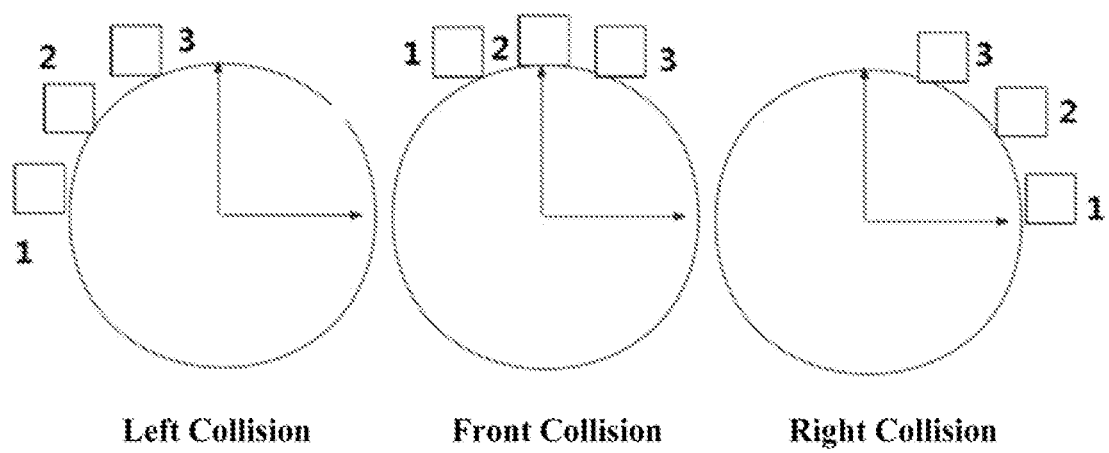
FIG. 2 is a schematic diagram of determining candidate positions of a collision according to an embodiment of the present disclosure.

In one embodiment, after the collided area of the robot is determined according to the triggered signal corresponding to the collision, three candidate positions of the collision in the collided area are determined. FIG. 2 is a schematic diagram of determining candidate positions of a collision according to an embodiment of the present disclosure. As shown in the left part of FIG. 2, if the collision is at the left part, three candidate positions of the collisions at 30 degrees, 45 degrees and 60 degrees to the front left of the robot are determined to mark as candidate collided position 3, candidate collided position 2 and candidate collided position 1, respectively. As shown in the middle part of FIG. 2, if the collision is at the front part, three candidate positions of the collisions at 15 degrees to the front left, at 0 degree (straight ahead) of the robot, and at 15 degrees to the front right of the robot are determined to mark as candidate collided position 1, candidate collided position 2, and candidate collided position 3, respectively. As shown in the right part of FIG. 2, if the collision is at the right part, three candidate positions of the collisions at the 30 degrees, 45 degrees and 60 degrees to the front right are determined to mark as candidate collided position 3, candidate collided position 2 and candidate collided position 1, respectively. In practical applications, it may determine more or fewer candidate positions in the collided area.

S103: obtaining a motion trajectory of the robot after the collision.

Figure 3:
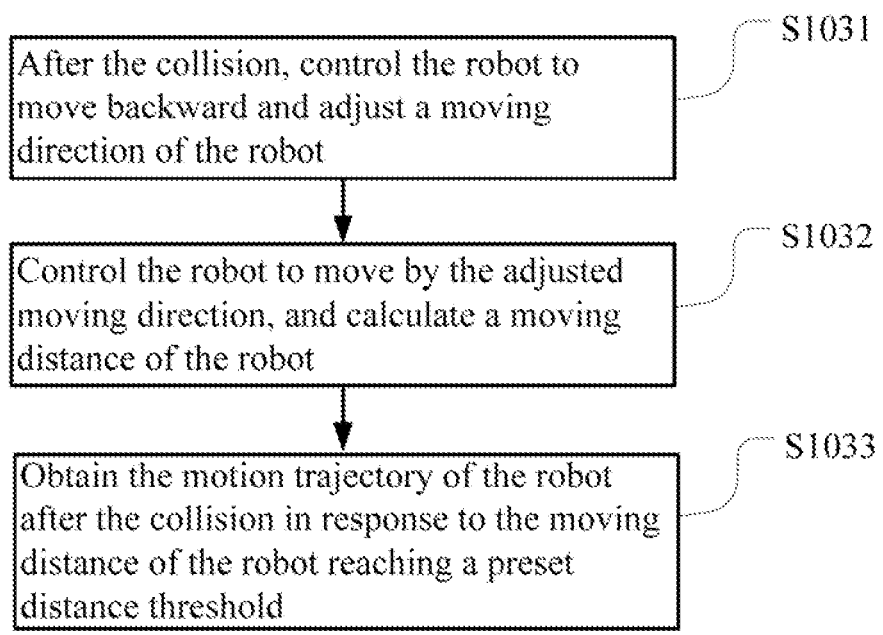
FIG. 3 is a flow chart of obtaining the trajectory of a robot after the collision according to an embodiment of the present disclosure.

FIG. 3 is a flow chart of obtaining the trajectory of a robot after the collision according to an embodiment of the present disclosure. As shown in FIG. 3, step S103 may include the following sub-steps.

S1031: after the collision, controlling the robot to move backward and adjusting a moving direction of the robot.

If the triggered signal corresponding to the collision is the left collision signal, the robot is moved backward and the moving direction of the robot is adjusted rightward; if the triggered signal corresponding to the collision is the right collision signal, the robot is moved backward and the moving direction of the robot is adjusted leftward; and if the triggered signal corresponding to the collision is the front collision signal, the robot is moved backward and the moving direction of the robot is adjusted leftward or rightward (which may be chosen randomly or configured manually). The robot may adjust the moving direction through rotation in situ, and the rotation angle may be 30 degrees.

In one embodiment, if the collision signal generated by the robot is the right collision signal, and the robot is moved along an edge (e.g., a wall) at its right, the robot may be backed up after the collision and its moving direction may be adjusted to the left so as to continue to move along the edge. The specific moving method adopted by the robot can be set according to the actual needs, which is not specifically limited herein.

S1032: controlling the robot to move by the adjusted moving direction, and calculating a moving distance of the robot.

After the moving direction of the robot is adjusted according to the collided area, it may continue to be moved in the adjusted direction, and the moving distance of the robot after the adjustment may be calculated.

S1033: obtaining the motion trajectory of the robot after the collision in response to the moving distance of the robot reaching a preset distance threshold.

In one embodiment, when the moving distance of the robot after the collision reaches the preset distance threshold (e.g., 30 cm), the moving trajectory of the robot after the collision may be obtained; and if the moving distance of the robot after the collision does not reach the preset distance threshold, it may continue to be moved along the adjusted moving direction, where the obtaining of the moving trajectory of the robot after the collision and its subsequent steps will not be performed if another collision occurs during the movement. The specific value of the distance threshold may be set according to actual needs, which is not specifically limited herein.

S104: obtaining a collided position by screening each of the candidate positions of the collision according to the motion trajectory.

Figure 4:
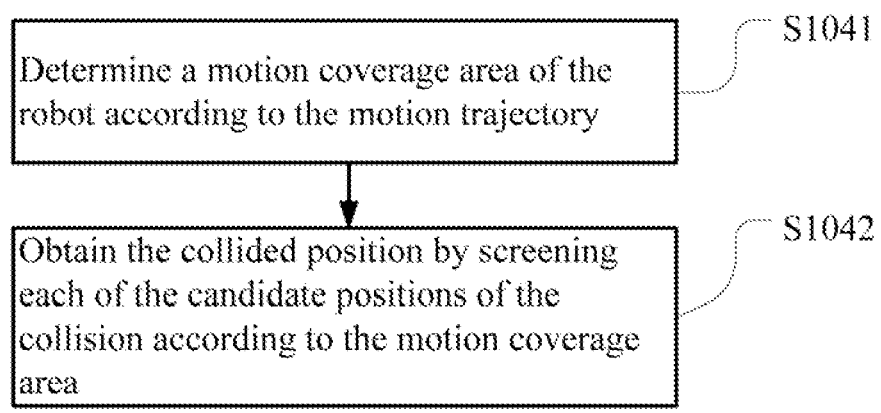
FIG. 4 is a flow chart of obtaining the collided position by screening each of the candidate positions of the collision according to the motion coverage area according to an embodiment of the present disclosure.

FIG. 4 is a flow chart of obtaining the collided position by screening each of the candidate positions of the collision according to the motion coverage area according to an embodiment of the present disclosure. As shown in FIG. 4, step S104 may include the following sub-steps.

S1041: determining a motion coverage area of the robot according to the motion trajectory.

The motion coverage area of the robot may be determined by taking the moving trajectory of the robot as the central axis and taking the radius of the robot as the expansion distance so as to extend toward both sides of the central axis, respectively S1042: obtaining the collided position by screening each of the candidate positions of the collision according to the motion coverage area.

It determines whether each of the candidate positions of the collision is located in the motion coverage area. If the first plurality of candidate positions (e.g., candidate collided position 1, 2 and 3 in the left part of FIG. 2) of the collisions on a left side of the robot are located in the motion coverage area, the first candidate position of the collision on the left side that is not located in the motion coverage area may be screened as the collided position; and if the first plurality of candidate positions (e.g., candidate collided position 1, 2 and 3 in the right part of FIG. 2) of the collisions on a right side of the robot are located in the motion coverage area, the first candidate position of the collision on the right side that is not located in the motion coverage area may be screened as the collided position.

Figure 5:
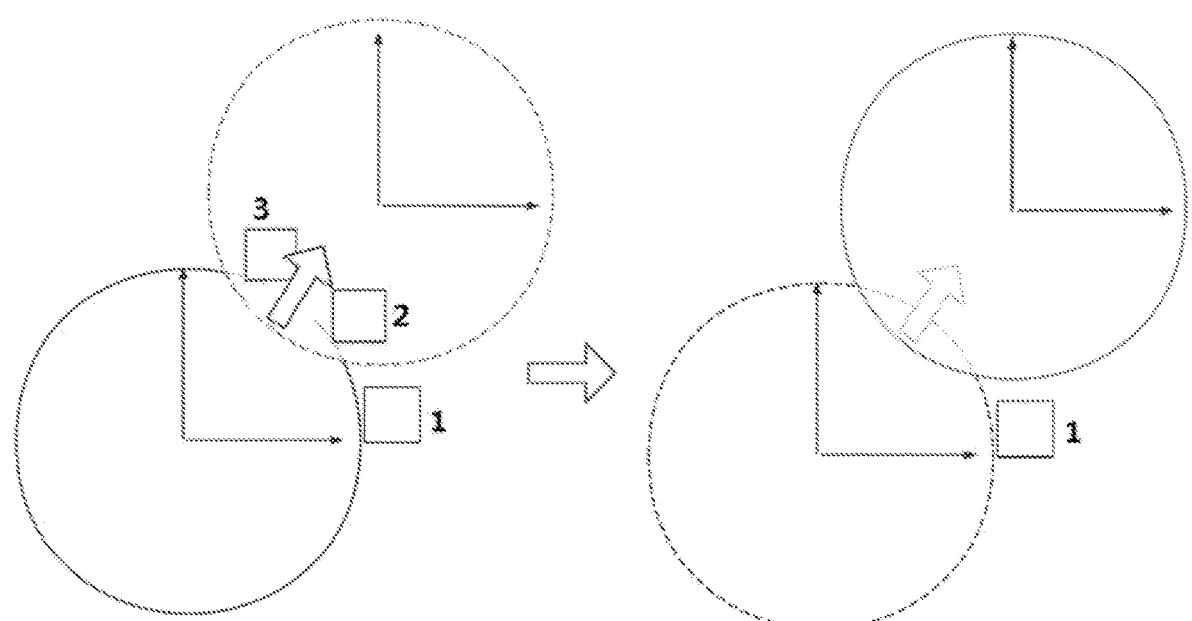
FIG. 5 is a schematic diagram of screening collided positions in accordance with the motion trajectory according to an embodiment of the present disclosure.

FIG. 5 is a schematic diagram of screening collided positions in accordance with the motion trajectory according to an embodiment of the present disclosure. As shown in FIG. 5, in this embodiment, since the collided area on the robot is the right part, and its movement is along the edge at its right, after the collision occurs, the moving direction will be adjusted to the left so as to continue to move along the edge at its right. At this time, a motion coverage path of the robot covers candidate collided position 3 and candidate collided position 2, so candidate collided position 1 will be taken as the collided position; otherwise, if the motion coverage path of the robot only covers candidate collided position 3, since the robot moves along the edge at its right, it only needs to take candidate collided position 2 as the collided position.

In the case that the collided area on the robot is the left part and its movement is alone an edge at its left, if the motion coverage path of the robot covers candidate collided position 3 and candidate collided position 2, candidate collided position I will be taken as the collided position; and if the motion coverage path of the robot only covers candidate collided position 3, candidate collided position 2 will be taken as the collided position.

In the case that the collided area on the robot is the front part and its movement is along the edge at its left or the edge at its right, if the motion coverage path of the robot covers candidate collided position 1 and candidate collided position 2, candidate collided position 3 will be taken as the collided position; if the motion coverage path of the robot covers candidate collided position 2 and candidate collided position 3, candidate collided position I will be taken as the collided position; if the motion coverage path of the robot only covers candidate collided position 1, candidate collided position 2 will be taken as the collided position; and if the motion coverage path of the robot only covers candidate collided position 3, candidate collided position 2 will be taken as the collided position.

The robot may update the map according to the collided position, so that the robot can continue to execute this method until the map is completely updated or finish its movements in the area of the map.

To sum up, in this embodiment, it obtains, from a collision sensor of the robot, a triggered signal corresponding to a collision of the robot; determines at least two candidate positions of the collision based on the triggered signal corresponding to the collision; obtains a motion trajectory of the robot after the collision; and obtains a collided position by screening each of the candidate positions of the collision according to the motion trajectory. In this manner, when the robot collides during its movement, the collision signal generated by the collision sensor of the robot can accurately mark the collided position, thereby reducing the probability of the robot colliding again at the same position.

It should be understood that, the sequence of the serial number of the steps in the above-mentioned embodiments does not mean the execution order while the execution order of each process should be determined by its function and internal logic, which should not be taken as any limitation to the implementation process of the embodiments.

Figure 6:
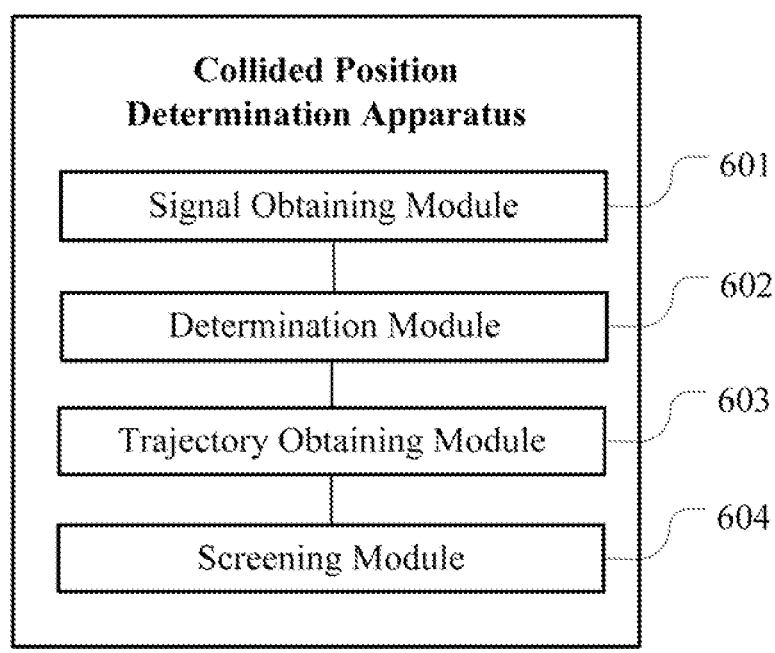
FIG. 6 is a schematic block diagram of the structure of a collided position determination apparatus according to an embodiment of the present disclosure.

FIG. 6 is a schematic block diagram of the structure of a collided position determination apparatus according to an embodiment of the present disclosure. As shown in FIG. 6, in this embodiment, a collided position determination apparatus corresponding to the collided position determination method of the above-mentioned embodiment is provided. In this embodiment, the collided position determination apparatus may include:

- a signal obtaining module 601 configured to obtain, from a collision sensor of the robot, a triggered signal corresponding to a collision of the robot;
- a determination module 602 configured to determine at least two candidate positions of the collision based on the triggered signal corresponding to the collision;
- a trajectory obtaining module 603 configured to obtain a motion trajectory of the robot after the collision; and
- a screening module 604 configured to obtain a collided position by screening each of the candidate positions of the collision according to the motion trajectory.

In one embodiment, the trajectory obtaining module 603 may include:

- an adjustment sub-module configured to, after the collision, control the robot to move backward and adjusting a moving direction of the robot;
- a movement sub-module configured to control the robot to move by the adjusted moving direction, and calculating a moving distance of the robot; and
- an obtaining sub-module configured to obtain the motion trajectory of the robot after the collision in response to the moving distance of the robot reaching a preset distance threshold.

In one embodiment, the adjustment sub-module may include:

- a rightward adjustment unit configured to adjust the moving direction of the robot rightward, in response to the triggered signal corresponding to the collision being a left collision signal;
- a leftward adjustment unit configured to adjust the moving direction of the robot leftward, in response to the triggered signal corresponding to the collision being a right collision signal; and
- an adjustment unit configured to adjusting the move direction of the robot leftward or rightward, in response to the triggered signal corresponding to the collision being a front collision signal.

In one embodiment, the screening module 604 may include:

- an area determining sub-module configured to determine a motion coverage area of the robot according to the motion trajectory; and
- a position screening sub-module configured to obtain the collided position by screening each of the candidate positions of the collision according to the motion coverage area.

In one embodiment, the area determining sub-module may include:

- a central axis determining unit configured to use the motion trajectory as a central axis of the motion coverage area; and
- a coverage area determining unit configured to obtain the motion coverage area by extending the central axis to both sides, respectively by a preset extension distance, wherein the extension distance is a radius of the robot.

In one embodiment, the position screening sub-module may include:

- a determination unit configured to determine whether each of the candidate positions of the collision is within the motion coverage area;
- a left side screening unit configured to select the first candidate position of the collision not within the motion coverage area on a left side of the robot as the collided position, in response to the first plurality of the candidate positions of the collisions on the left side being within the motion coverage area; and a right side screening unit configured to select the first candidate position of the collision not within the motion coverage area on a right side of the robot as the collided position, in response to the first plurality of the candidate positions of the collisions on the right side being within the motion coverage area.

In one embodiment, the determination module 602 may include:

a left collision determining submodule configured to determine the at least two candidate positions of the collision at a left part of the robot, in response to the triggered signal corresponding to the collision being a left collision signal;

a right collision determining submodule configured to determine the at least two candidate positions of the collision at a right part of the robot, in response to the triggered signal corresponding to the collision being a right collision signal; and a front collision determining submodule configured to determine the at least two candidate positions of the collision at a front part of the robot, in response to the triggered signal corresponding to the collision being a front collision signal.

Those skilled in the art may clearly understand that, for the convenience and simplicity of description, for the specific operation process of the above-mentioned apparatus, modules and units, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Figure 7:
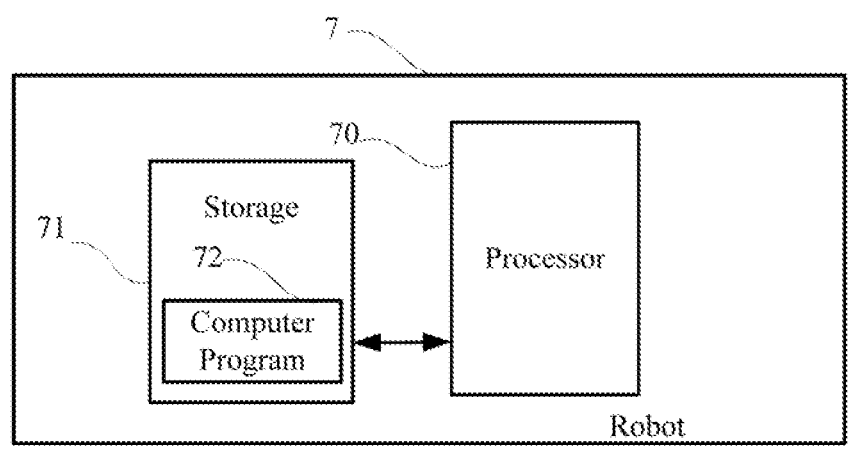
FIG. 7 is a schematic block diagram of a robot according to an embodiment of the present disclosure.

FIG. 7 is a schematic block diagram of a robot according to an embodiment of the present disclosure. For convenience of description, only parts related to this embodiment are shown.

As shown in FIG. 7, in this embodiment, the robot 7 includes a processor 70, a storage 71, and a computer program 72 stored in the storage 71 and executable on the processor 70. When executing (instructions in) the computer program 72, the processor 70 implements the steps in the above-mentioned embodiments of the collided position determination method, for example, steps S101-S104 shown in FIG. 1. Alternatively, when the processor 70 executes the (instructions in) computer program 72, the functions of each module/unit in the above-mentioned device embodiments, for example, the functions of the modules 601-604 shown in FIG. 6 are implemented.

Exemplarily, the computer program 72 may be divided into one or more modules/units, and the one or more modules/units are stored in the storage 71 and executed by the processor 70 to realize the present disclosure. The one or more modules/units may be a series of computer program instruction sections capable of performing a specific function, and the instruction sections are for describing the execution process of the computer program 72 in the robot 7.

It can be understood by those skilled in the art that FIG. 7 is merely an example of the robot 7 and does not constitute a limitation on the robot 7, and may include more or fewer components than those shown in the figure, or a combination of some components or different components. For example, the robot 7 may further include an input/output device, a network access device, a bus, and the like.

The processor 70 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 71 may be an internal storage unit of the robot 7, for example, a hard disk or a memory of the robot 7. The storage 71 may also be an external storage device of the robot 7, for example, a plug-in hard disk, a smart media card (SMC), a secure digital (SD) card, flash card, and the like, which is equipped on the robot 7. Furthermore, the storage 71 may further include both an internal storage unit and an external storage device, of the robot 7. The storage 71 is configured to store the computer program 72 and other programs and data required by the robot 7. The storage 71 may also be used to temporarily store data that has been or will be output.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Those ordinary skilled in the art may clearly understand that, the exempliticative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/robot and method may be implemented in other manners. For example, the above-mentioned apparatus/robot embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer readable storage medium, which may implement the steps of each of the above-mentioned method embodiments when executed by a processor. In which, the computer program includes computer program codes which may be the form of source codes, object codes, executable files, certain intermediate, and the like. The computer readable medium may include any entity or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented method for determining a collided position on a robot having a collision sensor, comprising:
obtaining, from the collision sensor of the robot, a triggered signal corresponding to a collision of the robot;
determining at least two candidate positions of the collision based on the triggered signal corresponding to the collision;
obtaining a motion trajectory of the robot after the collision; and
obtaining the collided position by screening each of the candidate positions of the collision according to the motion trajectory.

2. The method of claim 1, wherein obtaining the motion trajectory of the robot after the collision comprises:
after the collision, controlling the robot to move backward and adjusting a moving direction of the robot;
controlling the robot to move by the adjusted moving direction, and calculating a moving distance of the robot; and
obtaining the motion trajectory of the robot after the collision in response to the moving distance of the robot reaching a preset distance threshold.

3. The method of claim 2, wherein adjusting the moving direction of the robot comprises:
adjusting the moving direction of the robot rightward, in response to the triggered signal corresponding to the collision being a left collision signal;
adjusting the moving direction of the robot leftward, in response to the triggered signal corresponding to the collision being a right collision signal; and
adjusting the moving direction of the robot leftward or rightward, in response to the triggered signal corresponding to the collision being a front collision signal.

4. The method of claim 1, wherein obtaining the collided position by screening each of the candidate positions of the collision according to the motion trajectory comprises:
determining a motion coverage area of the robot according to the motion trajectory; and
obtaining the collided position by screening each of the candidate positions of the collision according to the motion coverage area.

5. The method of claim 4, wherein determining the motion coverage area of the robot according to the motion trajectory comprises:
using the motion trajectory as a central axis of the motion coverage area; and
obtaining the motion coverage area by extending the central axis to both sides, respectively by a preset extension distance, wherein the extension distance is a radius of the robot.

6. The method of claim 4, wherein obtaining the collided position by screening each of the candidate positions of the collision according to the motion coverage area comprises:
determining whether each of the candidate positions of the collision is within the motion coverage area;
selecting a first candidate position of the collision not within the motion coverage area on a left side of the robot as the collided position, in response to a portion of the candidate positions of the collisions on the left side being within the motion coverage area, wherein the first candidate position is a candidate position of the collision on the left side of the robot that is outside the motion coverage area and closest to the motion coverage area; and
selecting a second candidate position of the collision not within the motion coverage area on a right side of the robot as the collided position, in response to a portion of the candidate positions of the collisions on the right side being within the motion coverage area, wherein the second candidate position is a candidate position of the collision on the right side of the robot that is outside the motion coverage area and closest to the motion coverage area.

7. The method of claim 1, wherein determining the at least two candidate positions of the collision based on the triggered signal corresponding to the collision comprises:
determining the at least two candidate positions of the collision at a left part of the robot, in response to the triggered signal corresponding to the collision being a left collision signal;
determining the at least two candidate positions of the collision at a right part of the robot, in response to the triggered signal corresponding to the collision being a right collision signal; and
determining the at least two candidate positions of the collision at a front part of the robot, in response to the triggered signal corresponding to the collision being a front collision signal.

8. A non-transitory computer-readable storage medium for storing one or more computer programs, wherein the one or more computer programs comprise:
instructions for obtaining, from the collision sensor of the robot, a triggered signal corresponding to a collision of the robot;
instructions for determining at least two candidate positions of the collision based on the triggered signal corresponding to the collision;
instructions for obtaining a motion trajectory of the robot after the collision; and
instructions for obtaining the collided position by screening each of the candidate positions of the collision according to the motion trajectory.

9. The non-transitory computer-readable storage medium of claim 8, wherein instructions for obtaining the motion trajectory of the robot after the collision comprise:
instructions for after the collision, controlling the robot to move backward and adjusting a moving direction of the robot;
instructions for controlling the robot to move by the adjusted moving direction, and calculating a moving distance of the robot; and
instructions for obtaining the motion trajectory of the robot after the collision in response to the moving distance of the robot reaching a preset distance threshold.

10. The non-transitory computer-readable storage medium of claim 9, wherein instructions for adjusting the moving direction of the robot comprise:
instructions for adjusting the moving direction of the robot rightward, in response to the triggered signal corresponding to the collision being a left collision signal;
instructions for adjusting the moving direction of the robot leftward, in response to the triggered signal corresponding to the collision being a right collision signal; and
instructions for adjusting the moving direction of the robot leftward or rightward, in response to the triggered signal corresponding to the collision being a front collision signal.

11. The non-transitory computer-readable storage medium of claim 8, wherein instructions for obtaining the collided position by screening each of the candidate positions of the collision according to the motion trajectory comprise:
instructions for determining a motion coverage area of the robot according to the motion trajectory; and
instructions for obtaining the collided position by screening each of the candidate positions of the collision according to the motion coverage area.

12. The non-transitory computer-readable storage medium of claim 11 wherein instructions for determining the motion coverage area of the robot according to the motion trajectory comprise:
instructions for using the motion trajectory as a central axis of the motion coverage area; and
instructions for obtaining the motion coverage area by extending the central axis to both sides, respectively by a preset extension distance, wherein the extension distance is a radius of the robot.

13. The non-transitory computer-readable storage medium of claim 11, wherein instructions for obtaining the collided position by screening each of the candidate positions of the collision according to the motion coverage area comprise:
instructions for determining whether each of the candidate positions of the collision is within the motion coverage area;
instructions for selecting a first candidate position of the collision not within the motion coverage area on a left side of the robot as the collided position, in response to a portion of the candidate positions of the collisions on the left side being within the motion coverage area, wherein the first candidate position is a candidate position of the collision on the left side of the robot that is outside the motion coverage area and closest to the motion coverage area; and
instructions for selecting a second candidate position of the collision not within the motion coverage area on a right side of the robot as the collided position, in response to a portion of the candidate positions of the collisions on the right side being within the motion coverage area, wherein the second candidate position is a candidate position of the collision on the right side of the robot that is outside the motion coverage area and closest to the motion coverage area.

14. A robot, comprising:
a processor;
a memory coupled to the processor; and
one or more computer programs stored in the memory and executable on the processor;
wherein, the one or more computer programs comprise:
instructions for obtaining, from the collision sensor of the robot, a triggered signal corresponding to a collision of the robot;
instructions for determining at least two candidate positions of the collision based on the triggered signal corresponding to the collision;
instructions for obtaining a motion trajectory of the robot after the collision; and
instructions for obtaining the collided position by screening each of the candidate positions of the collision according to the motion trajectory.

15. The robot of claim 14, wherein instructions for obtaining the motion trajectory of the robot after the collision comprise:
instructions for after the collision, controlling the robot to move backward and adjusting a moving direction of the robot;
instructions for controlling the robot to move by the adjusted moving direction, and calculating a moving distance of the robot; and instructions for obtaining the motion trajectory of the robot after the collision in response to the moving distance of the robot reaching a preset distance threshold.

16. The robot of claim 15, wherein instructions for adjusting the moving direction of the robot comprise:
   instructions for adjusting the moving direction of the robot rightward, in response to the triggered signal corresponding to the collision being a left collision signal;
   instructions for adjusting the moving direction of the robot leftward, in response to the triggered signal corresponding to the collision being a right collision signal; and
   instructions for adjusting the moving direction of the robot leftward or rightward, in response to the triggered signal corresponding to the collision being a front collision signal.

17. The robot of claim 14, wherein instructions for obtaining the collided position by screening each of the candidate positions of the collision according to the motion trajectory comprise:
   instructions for determining a motion coverage area of the robot according to the motion trajectory; and
   instructions for obtaining the collided position by screening each of the candidate positions of the collision according to the motion coverage area.

18. The robot of claim 17 wherein instructions for determining the motion coverage area of the robot according to the motion trajectory comprise:
   instructions for using the motion trajectory as a central axis of the motion coverage area; and
   instructions for obtaining the motion coverage area by extending the central axis to both sides, respectively by a preset extension distance, wherein the extension distance is a radius of the robot.

19. The robot of claim 17, wherein instructions for obtaining the collided position by screening each of the candidate positions of the collision according to the motion coverage area comprise:
   instructions for determining whether each of the candidate positions of the collision is within the motion coverage area;
   instructions for selecting a first candidate position of the collision not within the motion coverage area on a left side of the robot as the collided position, in response to a portion of the candidate positions of the collisions on the left side being within the motion coverage area, wherein the first candidate position is a candidate position of the collision on the left side of the robot that is outside the motion coverage area and closest to the motion coverage area; and
   instructions for selecting a second candidate position of the collision not within the motion coverage area on a right side of the robot as the collided position, in response to a portion of the candidate positions of the collisions on the right side being within the motion coverage area, wherein the second candidate position is a candidate position of the collision on the right side of the robot that is outside the motion coverage area and closest to the motion coverage area.

20. The robot of claim 14, wherein instructions for determining the at least two candidate positions of the collision based on the triggered signal corresponding to the collision comprise:
   instructions for determining the at least two candidate positions of the collision at a left part of the robot, in response to the triggered signal corresponding to the collision being a left collision signal;
   instructions for determining the at least two candidate positions of the collision at a right part of the robot, in response to the triggered signal corresponding to the collision being a right collision signal; and
   instructions for determining the at least two candidate positions of the collision at a front part of the robot, in response to the triggered signal corresponding to the collision being a front collision signal.

* * * * *